United States Patent [19]

Shen

[11] Patent Number: 5,390,885

[45] Date of Patent: Feb. 21, 1995

[54] LOCKING MECHANISM FOR A PORTABLE TRIPOD OF A Q-PAD

[76] Inventor: Jack Shen, 6F, No. 416, Sec. 4, Jen Ai Rd., Taipei, Taiwan, Prov. of China

[21] Appl. No.: 215,412

[22] Filed: Mar. 21, 1994

[51] Int. Cl.6 ............................................. F16M 11/38
[52] U.S. Cl. ..................................... 248/168; 354/81
[58] Field of Search ............... 248/168, 169, 170, 171, 248/435; 354/82, 293, 81

[56] References Cited

U.S. PATENT DOCUMENTS

| | | | |
|---|---|---|---|
| 1,524,973 | 2/1925 | Hazelton | 248/168 X |
| 2,673,636 | 3/1954 | Vermette | 248/168 X |
| 4,317,552 | 3/1982 | Weidler | 248/168 |
| 4,545,660 | 10/1985 | Rudolf | 354/82 |
| 4,648,697 | 3/1987 | Kawazoe | 248/171 X |
| 4,648,698 | 3/1987 | Iwasaki | 354/293 X |
| 4,751,540 | 6/1988 | Jones | 354/81 X |
| 4,886,230 | 12/1989 | Jones | 248/170 |
| 5,043,750 | 8/1991 | Yamaguchi | 354/81 X |

FOREIGN PATENT DOCUMENTS

| | | | |
|---|---|---|---|
| 978162 | 4/1951 | France | 248/171 |
| 916607 | 1/1963 | United Kingdom | 248/168 |

Primary Examiner—J. Franklin Foss

[57] ABSTRACT

A locking mechanism for a portable tripod of a Q-Pad comprises a casing assembly jointly assembled by a lower casing and an upper casing. At least three legs are rotatable attached to the casing assembly. The casing assembly further includes a retaining cutout. A supporting body defines a supporting surface for supporting a camera is pivoted at the cutout of the casing assembly. The casing assembly further includes a locking mechanism wherein the supporting body can be held a desired angle with respect to the casing assembly when the locking mechanism is held in the locked position. The supporting body can be released when the locking mechanism is held in the released position.

4 Claims, 7 Drawing Sheets

LOCKING MECHANISM FOR A PORTABLE TRIPOD OF A Q-PAD

BACKGROUND OF THE INVENTION

The present invention relates to a supporting mechanism, more particularly, to a locking mechanism for a portable tripod of a Q-Pad. The locking mechanism facilitates an easy adjustment of the leg of the tripod to any inclined angle.

The inconvenience of the conventional tripods for supporting cameras is the bulk size. On the other hand, when the legs of the tripod are retracted, they have a preset length which is not suitable for storage. When the user wants to take a photo for a special scenery, not only the camera shall be carried heavily, but also shall the tripod be carried as well. On the other hand, the conventional tripod is heavy and with a considerably large size. It really becomes a burden for the photographer. In light of this, there is still a room for improvement on the tripod for a camera.

SUMMARY OF THE INVENTION

It is the object of the present invention to provide a locking mechanism for a portable tripod of a Q-Pad. The legs of the tripod when not in use can be retracted into a relative small size and short length, so that the tripod can be conveniently stored together with the cameras and its accessories without bringing any extraordinary inconvenience.

BRIEF DESCRIPTION OF THE DRAWINGS

The structural and operational characteristics of the present invention and its advantages as compared to the known state of the prior art will be better understood from the following description, in conjunction with the attached drawings which show illustratively but not restrictively an example of a locking mechanism for a portable tripod of a Q-Pad. In the drawings.

DETAILED DESCRIPTION OF THE PREFERABLE EMBODIMENT

Figure 1:
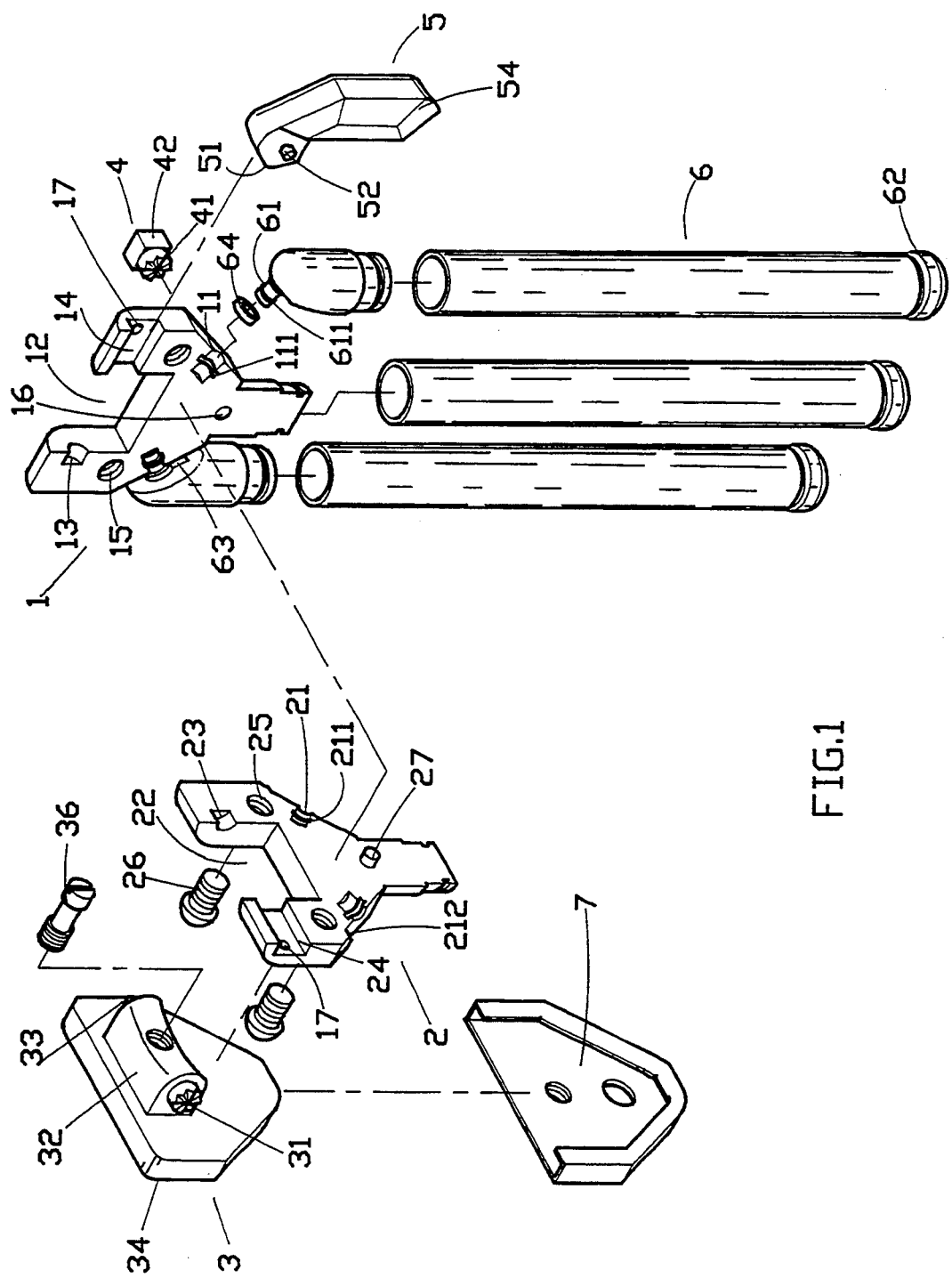
FIG. 1 is an exploded perspective view of a tripod with the locking mechanism made according to this invention.

Referring to FIG. 1, the locking mechanism for a portable tripod of a Q-Pad comprises a lower casing 1, having a dowel hole 16 and three receiving slots 11 which receive the legs 6 of the tripod. A circular slot 111 is provided at the middle portion of the receiving slot 11. A retaining cutout 12 is provided at the upper portion of the lower casing 1 for receiving and retaining the wedge block 32 of the supporting body 3. A post slot 13 is provided at one end of the retaining cutout 12 and a rectangular slot 14 at the opposite end. A through hole 17 is provided at the rectangular slot 14. The lower casing 1 also has a pair of threaded holes 15 adjacent to the cutout 12.

An upper casing 2 has a dowel 27 which can be received by the dowel hole 16 of the lower casing 1. The upper casing further includes three receiving slots 21 which are corresponding to the receiving slots 11 of the lower casing 1. The receiving slot 21 of the upper casing 2 and the receiving slot 11 of the lower casing 1 jointly define a chamber for receiving and retaining the leg 6 thereof. A circular slot 211 is provided at the middle portion of 6he receiving slot 21. A biasing slot 212 is provided at the outer portion of the receiving slot 21. By this arrangement, the biasing block 63 of the leg 6 can be received by the biasing slot 212. A retaining cutout 22 is provided at the upper portion of the upper casing 2 for receiving and retaining the wedge block 32 of the supporting body 3. A post slot 23 is provided at one end of the retaining cutout 12 and a rectangular slot 24 at the opposite end. A through hole 17 is provided at the rectangular slot 14. The upper casing 2 further includes a pair of threaded holes 25 adjacent to the cutout 22 with respect to the threaded hole 15 of the lower casing 1.

Figure 2:
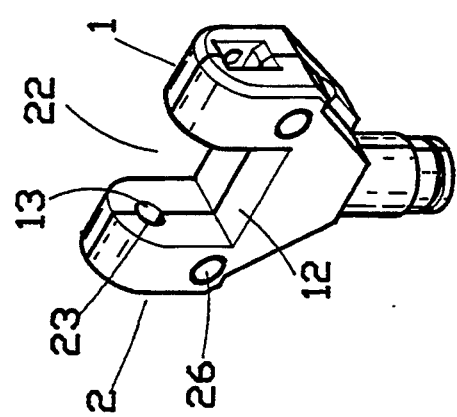
FIG. 2 is a perspective view of the locking mechanism wherein the upper casing and lower casing are assembled.

As shown in FIG. 2, since the configuration of the upper casing and lower casing are symmetrical, the upper casing 2 and the lower casing 1 are matched completely through the engagement of the dowel 27 and the dowel hole 16. Then the screw 26 is screwed into the holes 25, 15 to lock the upper casing 2 and lower casing 1.

A supporting body 3 defines a supporting surface 34 for supporting a camera. The supporting body 3 further includes a wedge block 32 at the underside. A threaded hole 35 is provided at the center of the wedge block 32. A locking screw 36 is inserted into the threaded hole 35. A post 33 and a rod 31 are provided at both end of the wedge block 32. The rod 31 has a top 311 with a plurality of radial slots thereof. By this arrangement, the post 33 and the rod 31 can be received by the post slots 13, 23 and rectangular slots 14, 24 respectively.

A locking block 4 defines a block body 4 and a boss 41 extending downward from the block body 4. The end portion 411 of the boss 41 has a plurality of radial slots with respect to the top 311 of the rod 31. The locking block 4 is received by the space defined jointly by the rectangular slots 14, 24 of the lower casing 1 and upper casing 2 so that the top 311 of the rod 31 is biased by the end portion 411 of the locking block 4.

A trigger member 5 defines a head portion 51 and a handle 54. A post 52 is provided at each side of the head portion 51. The post 52 on the head portion 51 of the trigger member 5 is received by the through hole 17 of the upper casing 2 and the lower casing 1 when the head portion 51 of the trigger member 5 is put into the chamber defined jointly by the rectangular slots 14, 24 of the lower casing 1 and upper casing 2. By this arrangement, the trigger member 5 is rotated within the chamber defined jointly by the rectangular slots 14, 24 of the lower casing 1 and upper casing 2. Hence, the locking block 4 engages the rod 31 when the trigger member 5 is held in a locked position. The rod 31 is released by the locking block 4 when the trigger member 5 is released from a locked position.

The legs 6 are made telescopically, so that it can be extended out and then retracted. A shoe member 62 is attached to the lower portion of the leg 6 and a head portion 61 with an inclined surface is attached to the upper portion of the leg 6. The head portion 61 includes a recessed slot 64 and a positioning post 65. A shaft member 61 is provided at the inclined surface. The shaft member 61 further includes a ring 611 which can be received by the circular slot defined jointly by the circular slots 111, 211 of the receiving slots 11, 21. Besides, a biasing block 63 is provided adjacent to the shaft member 61 which can be received by the biasing slot 212 of the upper casing 2.

By the assembly of those above described elements, a locking mechanism for a portable tripod of a Q-Pad is completed. The assembling procedures will be detailed described below.

The shaft member 61 of the leg 6 is installed into the receiving slot 11 so that the ring 611 of the shaft member 16 is rotatably received by the circular slot 111. Then the locking block 4 is disposed into the rectangular slot 14 so that the end portion 411 of the boss 41 faces toward inside of the slot 14. After that, the supporting body 3 is disposed into the cutout 12 of the lower casing 1 so that the post 33 and rod 31 are received by the post slot 13 and rectangular slot 14 respectively. On the other hand, the top 311 of the rod 31 faces the end portion 411 of the boss 41 of the locking block 4. Then the trigger member 5 is disposed into the rectangular slot 14 so that the post 52 on the head portion 51 of the trigger member 5 is rotatably received by the through hole 17 of the lower casing 2. After all the above described elements are put into position, the upper casing 2 is covered onto the lower casing 1 so that dowel 16 of the lower casing 1 is received by the dowel hole 27 of the upper casing 2. By this arrangement, all the elements are enclosed by the upper casing 2 and lower casing 1. At last, the screw 26 are inserted into the threaded holes 15, 25 to fasten the two halves together.

Figure 4:
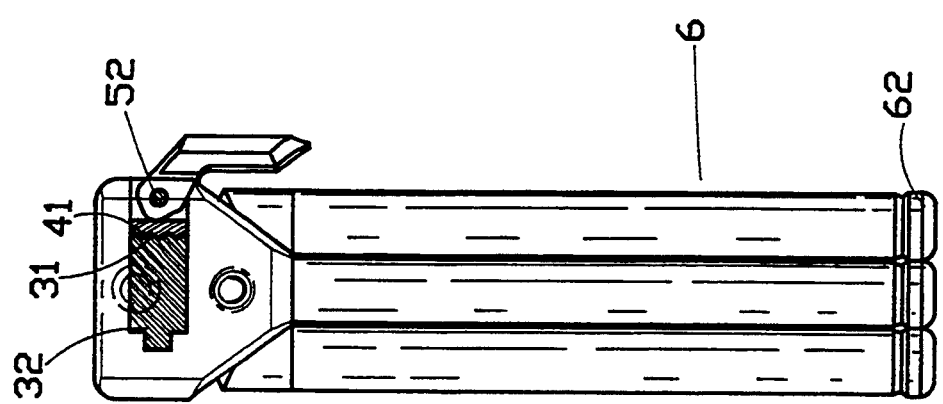
FIG. 4 is a sketch view of the tripod showing the trigger member held in a locked position.
Figure 5:
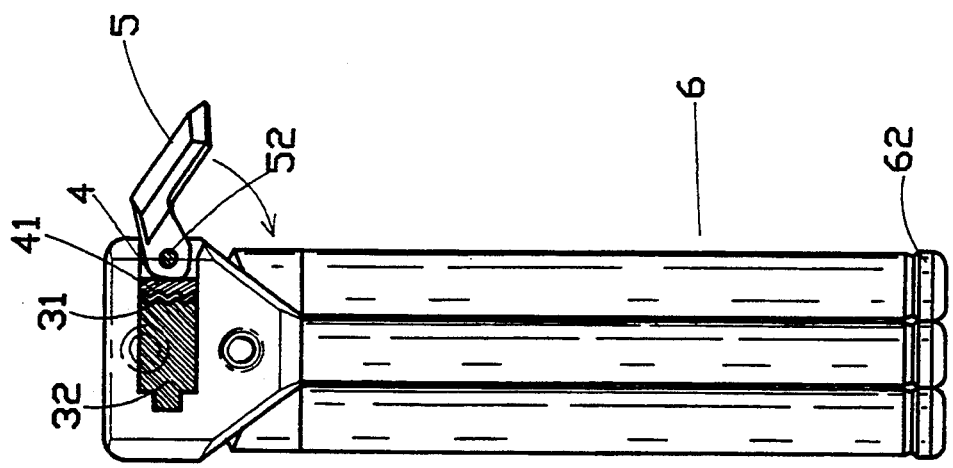
FIG. 5 is a sketch view of the tripod showing the trigger member held in a released position.
Figure 6:
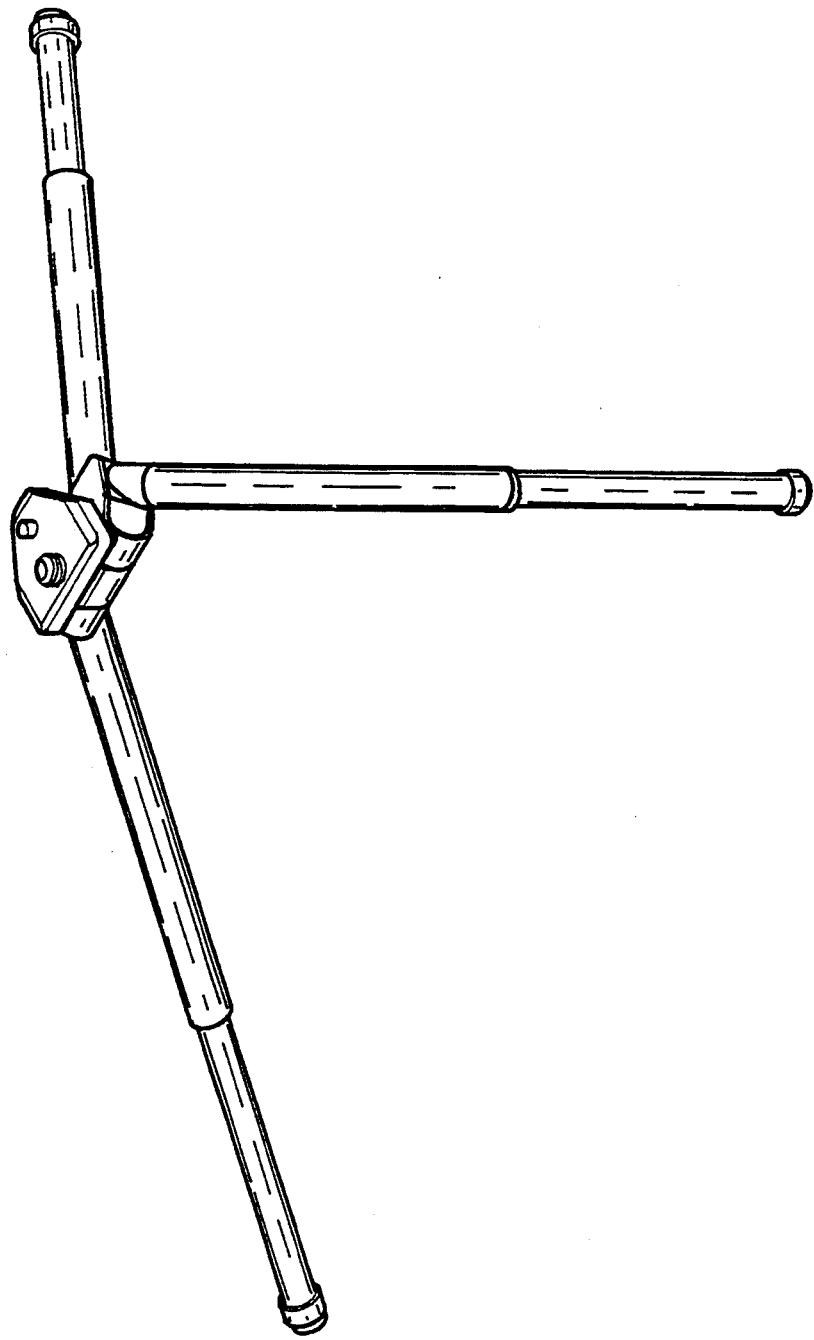
FIG. 6 is a perspective view of the tripod showing the three legs fully extended.
Figure 7:
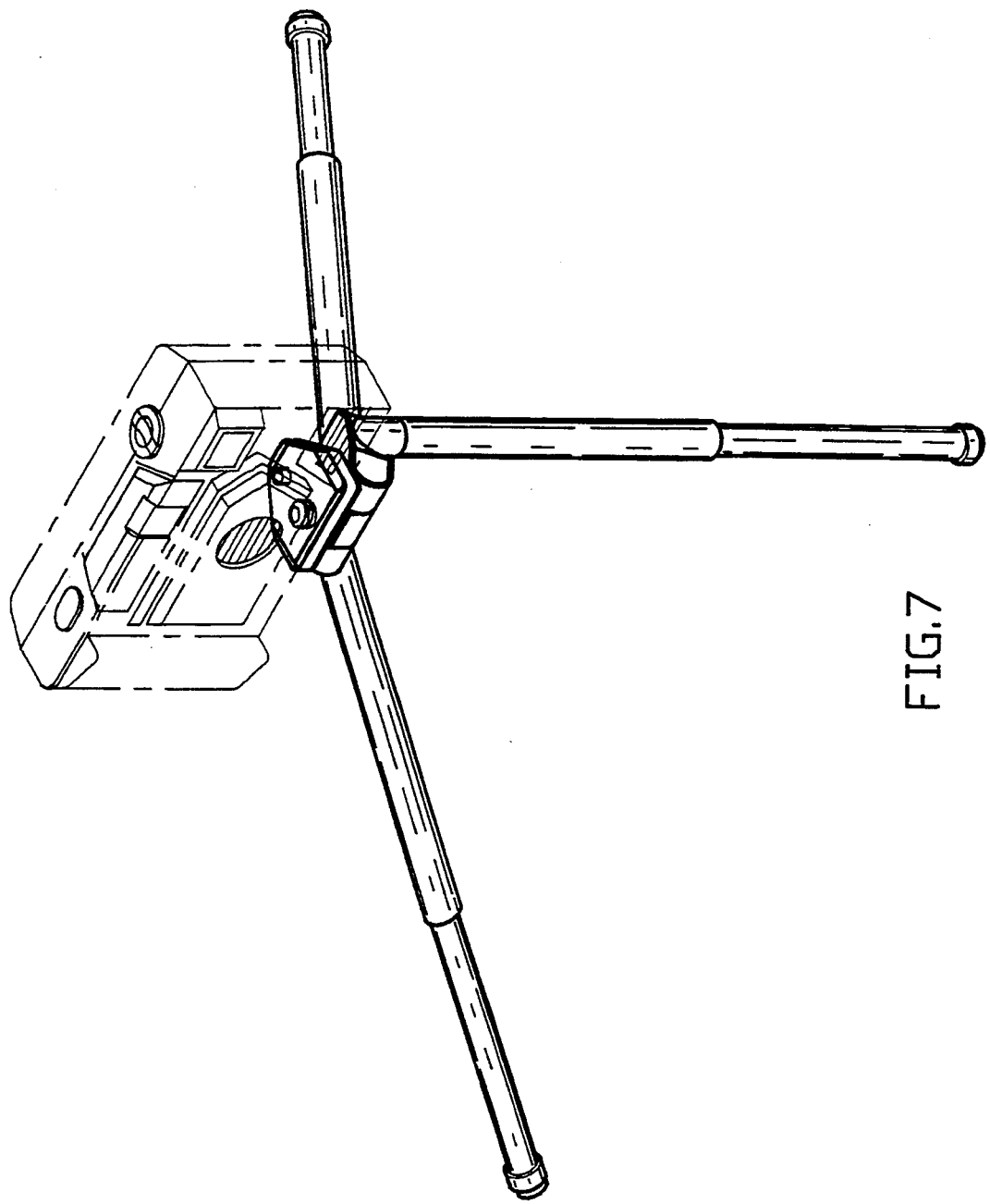
FIG. 7 is a sketch view showing a camera mounted on the tripod made according to the present invention.
Figure 8:
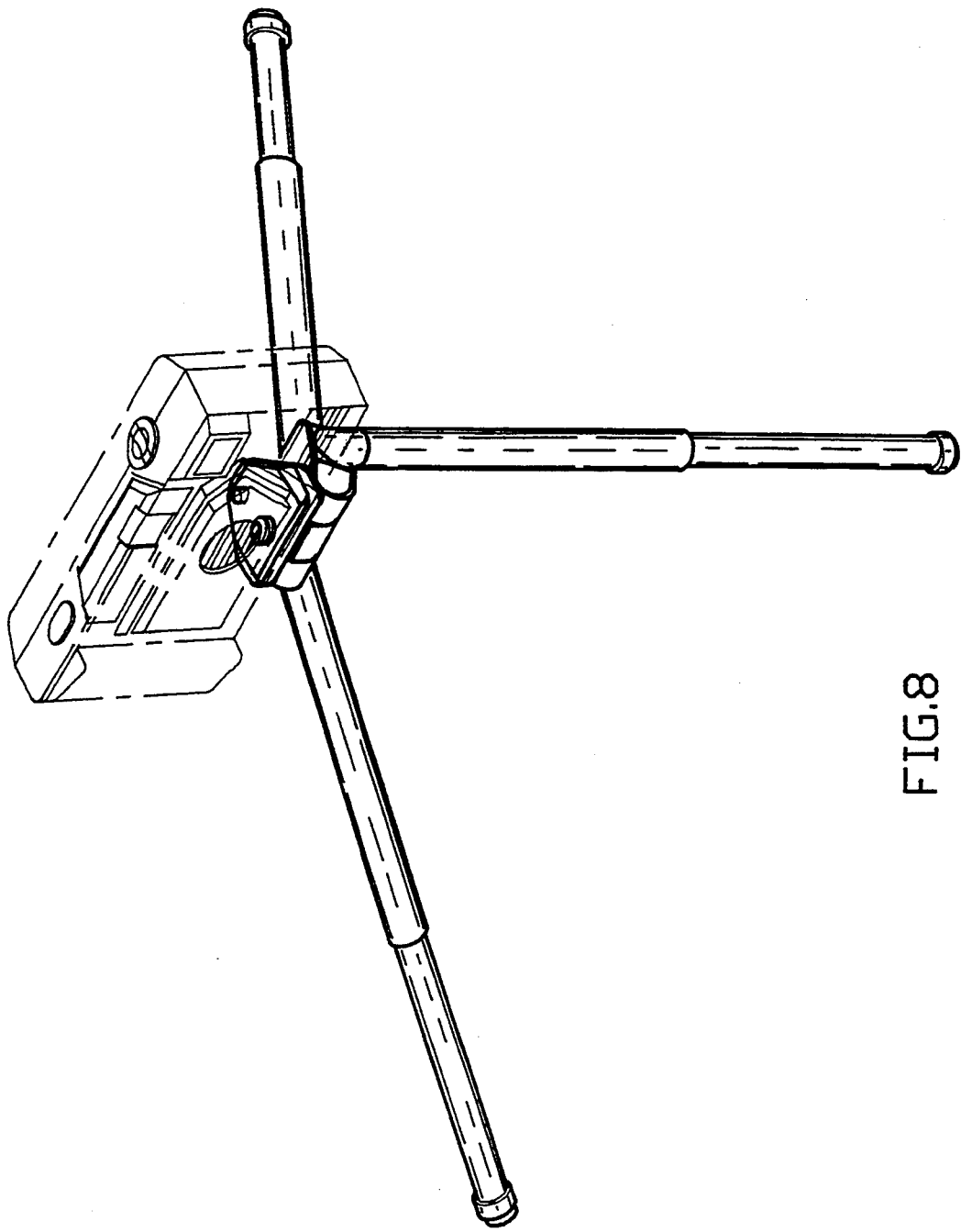
FIG. 8 is a still a sketch view showing a camera mounted on the tripod made according to the present invention.

In use, the legs 6 of the tripod are firstly released from their locked position by removing the biasing block 63 of each leg 6 from the respective biasing slot 212. Then the trigger member 5 is held in a released position, as shown in FIG. 5, so that the top 311 of the rod 31 is separated from the end portion 411 of the boss 41 of the locking block 4. Accordingly, the supporting body 3 is free to rotate relative to the assembly of the upper casing 2 and lower casing 1. When a desired angle is achieved, the trigger member 5 is moved down, as shown in FIG. 4, to the locked position. Accordingly, the top 311 of the rod 31 is engaged with the end portion 411 of the boss 41 of the locking block 4 to lock the supporting body 3 in the desired angle. Then the cushion pad 7 is disposed to the supporting body 3 providing a soft contact. At last, the tripod is adjusted for supporting a camera.

Figure 3:
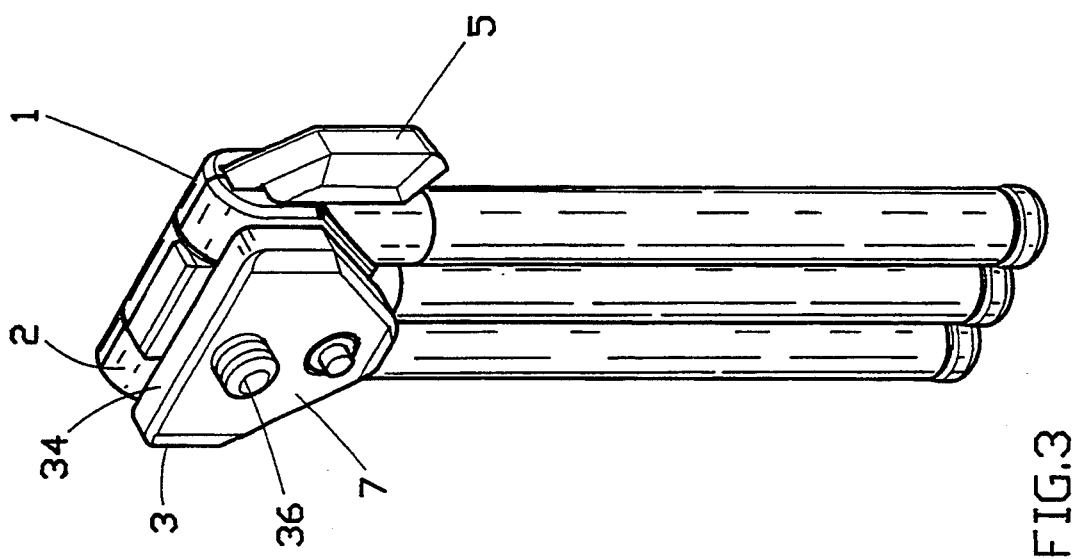
FIG. 3 is a perspective view of a tripod incorporated with a locking mechanism made according to the present invention.

When the photo is taken, the tripod can be readjusted to a completely retracted position, as shown in FIG. 3, for easy storage.

Although the present invention has been described in connection with the preferred embodiments thereof, many other variations and modifications will now become apparent to those skilled in the art without departing from the scope of the invention. It is preferred, therefore, that the present invention not be limited by the specific disclosure herein, but only by the appended claims.

What is claimed is:

1. A locking mechanism for a portable tripod of a Q-Pad comprising
   a casing assembly jointly assembled by a lower casing and an upper casing, a receiving slot being provided at the lower portion of the casing for receiving a leg thereof, a retaining cutout being provided at the upper portion of the casing assembly, a post slot being provided at one end of the retaining cutout and a rectangular slot being provided at the opposite end of the cutout, the upper casing and lower casing having a symmetrical configuration and fastened together by a screw;
   a supporting body defining a supporting surface for supporting a camera at top and a wedge block at the underside, said wedge block being pivoted received by said retaining cutout of said casing assembly, a post and rod being provided at both end of the wedge block, said rod having a top with radial slot thereof;
   a locking block defining a block body and a boss extending downward from said block body, the end portion of the boss having a plurality of radial slots with respect to said top of said rod, said locking block being received by the rectangular slots;
   a trigger member defining a head portion and a handle, a post being provided at each side of the head portion, the post on said head portion of said trigger member being movably received by the rectangular slot; and
   a leg defining a head portion with an inclined surface and a shoe, a shaft member being provided at the inclined surface, said shaft member being received by said receiving slot of said casing assembly, said head portion further including a recessed slot and a positioning post.

2. A locking mechanism as recited in claim 1, wherein a biasing slot is provided at the outer portion of the receiving slot, the biasing block of said leg can be releasably received thereof.

3. A locking mechanism as recited in claim 1, wherein said receiving slot further includes a circular slot in the middle portion and the shaft member of the head portion of the leg has a ring in the middle so that the ring of the shaft member can be movably received by the circular slot.

4. A locking mechanism as recited in claim 1, wherein the legs disposed at both sides can be opened so that the biasing block can link against the biasing slot, accordingly, the tripod can stand firmly with those three legs.

* * * * *